US010395107B2

(12) United States Patent
Kirita et al.

(10) Patent No.: US 10,395,107 B2
(45) Date of Patent: Aug. 27, 2019

(54) AUTHENTICATION METHOD, COMPUTER SYSTEM, SERVER COMPUTER AND AUTHENTICATION PROGRAM

(71) Applicants: KOTO CO., LTD., Kyoto (JP); PARK TECHNOLOGY LIMITED, London (GB)

(72) Inventors: Hiroshi Kirita, Kyoto (JP); Junpei Shibata, Kyoto (JP); Hiroki Oyama, Yokohama (JP); Norikazu Nakato, Sagamihara (JP)

(*) Notice: Subject to any disclaimer, the term of this patent is extended or adjusted under 35 U.S.C. 154(b) by 0 days.

(21) Appl. No.: 15/695,474

(22) Filed: Sep. 5, 2017

(65) Prior Publication Data

US 2019/0073526 A1    Mar. 7, 2019

(51) Int. Cl.
| | |
|---|---|
| G06F 3/045 | (2006.01) |
| G06K 9/00 | (2006.01) |
| G06F 3/044 | (2006.01) |
| G06Q 30/02 | (2012.01) |
| G06F 3/0354 | (2013.01) |
| H04M 1/02 | (2006.01) |

(52) U.S. Cl.
CPC ....... G06K 9/00436 (2013.01); G06F 3/0354 (2013.01); G06F 3/044 (2013.01); G06Q 30/0238 (2013.01); H04M 1/0202 (2013.01); H04M 2250/22 (2013.01)

(58) Field of Classification Search
USPC ......... 345/158, 173, 174; 719/315; 713/168; 706/46
See application file for complete search history.

(56) References Cited

U.S. PATENT DOCUMENTS

| | | | |
|---|---|---|---|
| 2005/0246716 A1* | 11/2005 | Smith | G06F 9/465 719/315 |
| 2007/0236453 A1* | 10/2007 | Maynard | G06F 17/2211 345/158 |
| 2009/0128502 A1* | 5/2009 | Li | G06F 17/24 345/173 |
| 2011/0238992 A1* | 9/2011 | Jancula | H04L 63/0428 713/168 |
| 2012/0078725 A1 | 3/2012 | Maitra et al. | |
| 2012/0197729 A1 | 8/2012 | Bertram et al. | |
| 2013/0076645 A1* | 3/2013 | Anantha | G06F 3/0488 345/173 |
| 2013/0194202 A1 | 8/2013 | Moberg et al. | |
| 2015/0138126 A1* | 5/2015 | Westerman | G06F 3/0412 345/173 |

(Continued)

FOREIGN PATENT DOCUMENTS

| | | |
|---|---|---|
| KR | 1020130026610 A | 3/2013 |
| WO | 2016175422 A1 | 3/2016 |

(Continued)

*Primary Examiner* — Thuy N Pardo
(74) *Attorney, Agent, or Firm* — Burns & Levinson LLP; Bruce D. Jobse (57) ABSTRACT

An authentication system and method is configured to correlate a first computer mounted with a touch panel owned by a store and a second computer, such as a smart device held by a client side, for performing a contact operation using an input device, and clarifying that both exist in the same space based on a time difference in the time of contact of both.

8 Claims, 7 Drawing Sheets

(56) References Cited

U.S. PATENT DOCUMENTS

2016/0171374 A1* 6/2016 Kim .................. G06N 5/04
 706/46
2017/0161769 A1 6/2017 Johnson et al.
2017/0300682 A1* 10/2017 Alten ................ G06F 21/32
 345/174
2018/0024681 A1* 1/2018 Bernstein ............ G06F 3/0412
 345/174

FOREIGN PATENT DOCUMENTS

WO 2016208810 A1 12/2016
WO 2017142093 A1 8/2017

* cited by examiner

AUTHENTICATION METHOD, COMPUTER SYSTEM, SERVER COMPUTER AND AUTHENTICATION PROGRAM

FIELD OF THE INVENTION

The present invention relates to an authentication method, a computer system, a server computer and an authentication program.

BACKGROUND OF THE INVENTION

A service is known that posts reputation advertisements and the like of various stores including restaurants and bars on the Internet and guides clients to real stores. A provider of the service posts an introduction column of the service contract store and acquires a browsing trace showing that the introduction column has been browsed from the service contract store, and the client browses the introduction column using a smart device such as a smart phone or a tablet and the like having a touch panel, obtains a coupon such as a discount that can be utilized when visiting the real store, and the service contract store places an input device which acts on the touch panel with respect to the coupon displayed on the smart device owned by the client and sends a browsing trace to the service provider via the smart device based on the contact information by the input device.

For example, there is an electrostatic capacitance type touch panel that detects a change in electrostatic capacitance, a press type touch panel that detects a change in a press amount, and a touch panel which adopts both of these as a touch panel of the smart device, and there is a stamp type input device in which a plurality of contactors to be contacted with a touch panel are arranged protruding and a contact coordinate point of a touch position is input as the input device.

In addition, a visit confirmation server in which a visit confirmation log is generated based on a log of browsing websites, and logs of actually visited stores listed on websites has been proposed as a service provider of the service, for example as described in Japanese Unexamined Patent Publication No. 2008-282291.

SUMMARY OF THE INVENTION

In the conventional service, since it is a system in which the service contract store side confirms that it is a visited store on which the service provider introduction column has been browsed by a coupon displayed on a touch panel, the service provider obtains a browsing trace of the introduction column and specifies the visit based on the browsing, and understands the usage state with respect to each service contract store, there is a problem in which the client's smart device must be relied on for the number of visiting clients, it is not clear whether a browsing trace was obtained at a real store, and it is not possible to understand the number of clients visiting more accurately.

Therefore, the present invention makes a touch panel equipped computer on the side that provides a space in the same space, and a smart device that the service receiving side holds compatible and performs a contact operation with the input device, and clarifies that they exist in the same space due to a time difference based on contact between the two.

In this way, the problem described above is solved by setting in advance a time difference based on contact from contact information obtained from a computer arranged in the service contract store and contact information obtained from a mobile terminal of a client visiting the store, and confirming the client who is visiting the service contract store.

The technical problem can be solved by the present disclosure as follows.

An authentication method related to the present disclosure includes a first computer and a second computer arranged with a display surface having a contact recognition function, and obtaining contact information from a contact with the display surface, one input device configured to make contact with the display surface of the first computer displaying red inkpad information and the display surface of the second computer, and a third computer configured to storing a permitted value when permitting contact by the one input device at the first computer and the second computer as a series of consecutive contacts, a step of transmitting contact information from the first computer and the second computer by the one input device to the third computer respectively at the first computer and the second computer, a step of storing values of time based on the first computer and the second computer when contact information is received from the first computer and the second computer respectively in the third computer, a step of judging whether or not contact information in the second computer corresponds to contact information in the first computer, when it is judged contact information in the second computer corresponds to contact information in the first computer, in a computer selected from any of the first computer, the second computer and the third computer, a step of judging whether or not a difference in time obtained from each value of time based on the first computer and the second computer stored in the third computer satisfies the permitted value of the time, and a step of transmitting viewing information in the third computer based on the red inkpad information displayed on the first computer to the second computer when it is judged that the permitted value is satisfied.

In addition, in the authentication method related to the present disclosure, the red inkpad information is the same as character information, image information or viewing information, and the first and/or the second computer is a mobile terminal.

A computer system according to the present disclosure includes a first computer and a second computer arranged with a display surface having a contact recognition function, and obtaining contact information from a contact with the display surface, one input device configured to make contact with the display surface of the first computer displaying red inkpad information and the display surface of the second computer, and a third computer configured to storing a permitted value when permitting contact by the one input device at the first computer and the second computer as a series of consecutive contacts, wherein the first computer includes a means for sending contact information on the first computer by the one input device to the third computer, the second computer includes a means for sending contact information on the second computer by the one input device to the third computer, the third computer includes a means for storing values of time based on the first computer and the second computer when contact information is received from the first computer and the second computer respectively, and a means for judging whether or not the contact information in the second computer corresponds to the contact information in the first computer, when it is judged that they correspond, in a computer selected from any of the first computer, the second computer and the third computer, judging whether or not a difference in time obtained from each value of time based on the first computer and the second computer stored in the third computer satisfies the permitted value of the time, and transmitting viewing information in the third computer based on the red inkpad information displayed on the first computer to the second computer when it is judged that the permitted value is satisfied.

In addition, in the computer system of the present disclosure, the first and/or the second computer is a mobile terminal.

In addition, a server computer related to the present disclosure includes a receiving means configured to receive contact information respectively obtained from a first computer and a second computer arranged with a display surface having a contact recognition function, by contact with the display surface by one input device, a permitted value storage means configured to store a permitted value of time when permitting contact of the one input device in the first computer and the second computer as a series of consecutive contacts, a contact information storage means configured to store with the contact information values of each time respectively based on the first computer and the second computer when contact information from the first computer and the second computer is received respectively, a first judgment means configured to judge whether the contact information in the second computer corresponds to the contact information in the first computer, a second judgment means configured to judge whether or not a difference in time obtained from a value of time based on the first computer and a value of time based on the second computer satisfies a permitted value of the time when it is judged they correspond, and a transmission means configured to transmit viewing information to the second computer as a series of consecutive contacts based on the contact information when it is judged that the permitted value of the time is satisfied.

Furthermore, an authentication program related to the present disclosure includes a red inkpad information memory means configured to store red inkpad information to be displayed on a display surface of a first communication terminal including the display surface having a contact recognition function, a first receiving means configured to receive contact information obtained by contact with the display surface of the first communication terminal by one input device and the red inkpad information, a first contact information memory means configured to store a value of time when the contact information at the first communication terminal is received by the first receiving means, the contact information and the red inkpad information, a second receiving means configured to receive contact information obtained from a second communication terminal including a display surface having a contact recognition function by contact with the display surface of the second communication terminal by the one input device, a second contact information memory means configured to store a value of time when contact information at the second communication terminal is received by the second receiving means and the contact information, a first judgment means configured to judge whether or not the contact information in the second communication terminal received by the second receiving means corresponds to the contact information in the first communication terminal received by the first receiving means, a second judgment means configured to judge whether or not a difference in time obtained from a value of time based on the first communication terminal and a value of time based on the second communication terminal satisfies a permitted value when permitting contact by the one input device at the first communication terminal and the second communication terminal as a series of consecutive contacts when it is judged by the first judgment means that they correspond, and a viewing information transmission means configured to transmit the viewing information to the second communication terminal based on the red inkpad information when it is judged that the permitted value is satisfied by the second judgment terminal.

According to the present disclosure, since a display surface of first and second computers (first and second communication terminals) having a display surface having a contact recognition function is contacted using one input device, and contact information on the first and second computers is obtained respectively at the third computer, and it is judged whether or not a permitted value of time when permitting a difference in time of acquisition as a series of consecutive contacts is satisfied, and thereby it is possible to determine that a contact operation by the one input device is a series of consecutive processes made in the same space where the first and second computers exist.

In addition, according to the present disclosure, since a series of contacts is authenticated based on contact information obtained by the first computer (first communication terminal) and contact information obtained by the second computer (second communication terminal) by contact of one input device, it is possible to identify a contact action used continuously between the first computer and the second computer.

In addition, according to the present disclosure, since it is authenticated that contact with the first and second computers (first and second communication terminals) by one input device is a series of contacts bridging over the first and second computers (first and second communication terminals), and therefore it is possible to identify the contact with the first and second computers as a contact action due to it existing in the same space and being continuously used between the first computer and the second computer, it is possible to display viewing information based on red inkpad information and red inkpad information displayed on the first computer on the second computer which is a series of operation targets.

Furthermore, according to the present disclosure, since stamp information is sent to the mobile terminal of a visiting client if a permitted value of a difference in time obtaining contact information obtained from a computer owned by a service contract store and contact information obtained from a mobile terminal of a visiting client is set in advance, and the difference when obtaining each contact information based on contact by the one input device satisfies the permitted value, since it is possible to clarify the client who has visited the service contract store, it is possible for the service provider to understand a more accurate number of visiting clients.

DETAILED DESCRIPTION OF THE INVENTION

The embodiments of the present disclosure are explained below based on the diagrams.

First Embodiment

Figure 1:
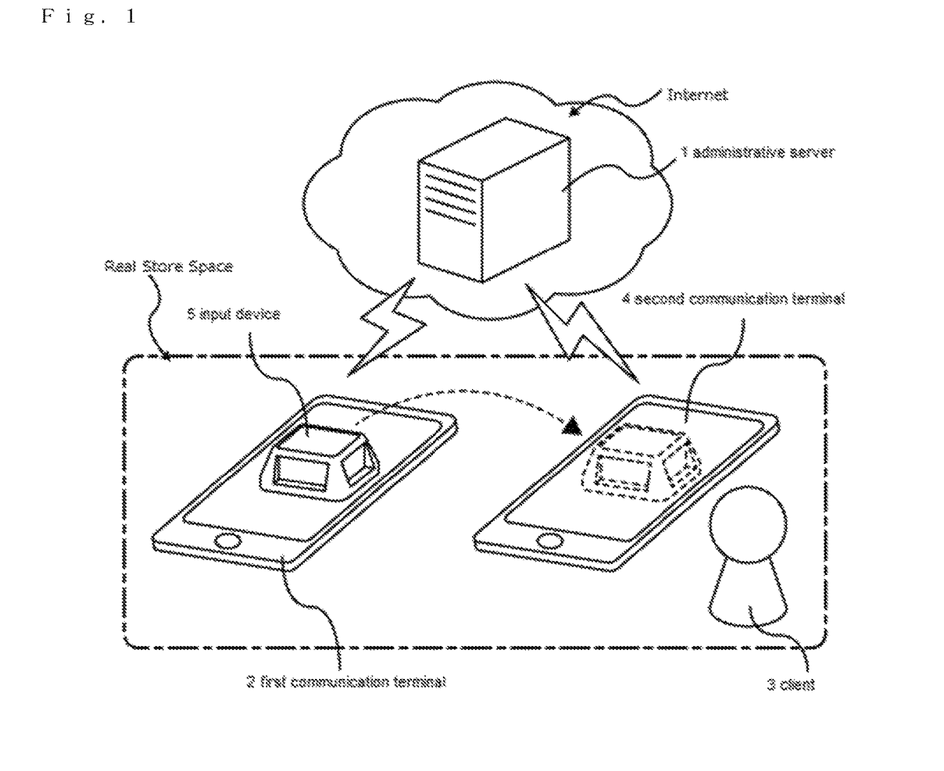
FIG. 1 is a structural diagram of a computer system showing one embodiment of the present disclosure.
Figure 2:
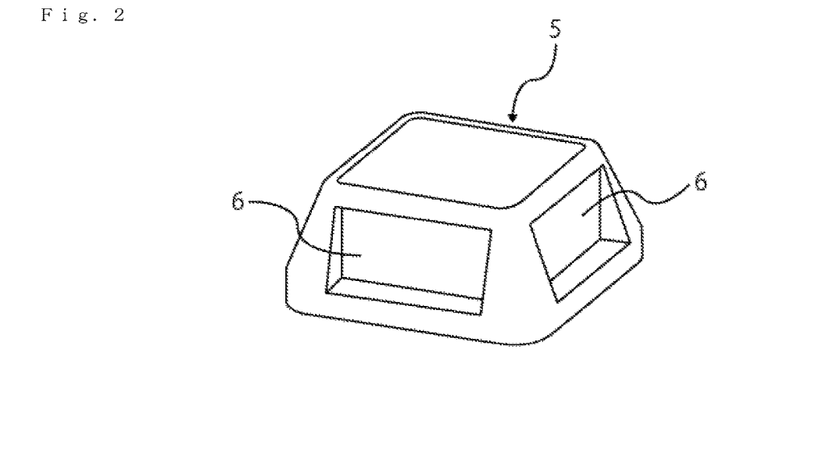
FIG. 2 is a perspective view diagram of an input device shown in FIG. 1.
Figure 3:
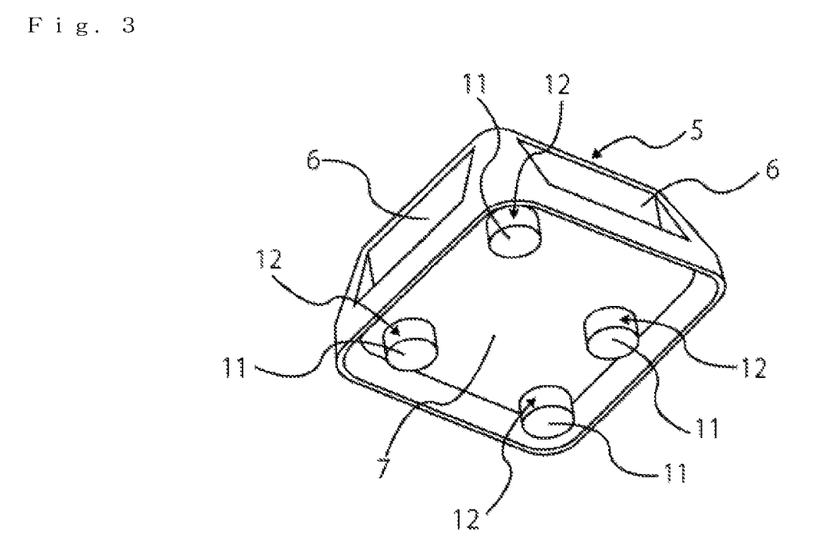
FIG. 3 is a perspective view diagram showing a lower part of the input device shown in FIG. 2.
Figure 4:
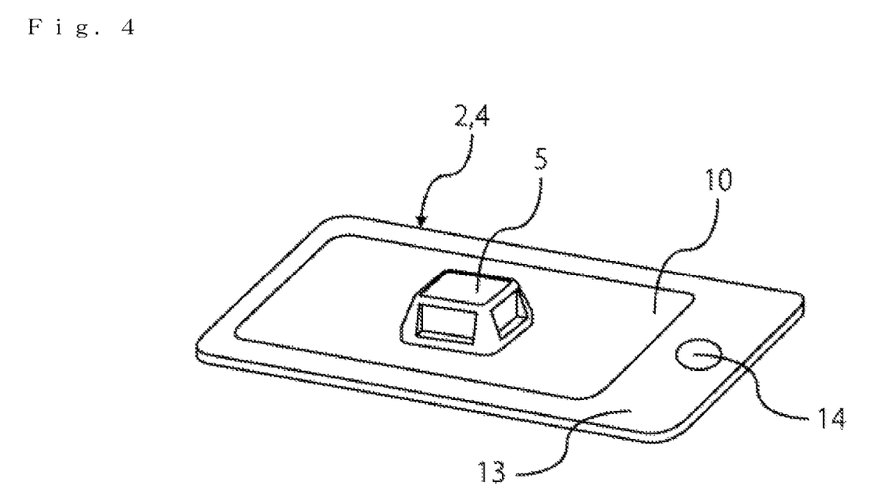
FIG. 4 is a perspective view diagram showing a state in which the input device shown in FIG. 2 is placed (contacted) on a panel module.

In the present embodiment, as is shown in FIG. 1, a computer system is explained formed from an administrative server (third computer) 1 of a service provider which provides a service for posting reputation advertisements and the like of various stores such as restaurants and bars on the Internet and guiding clients to a real store, a first communication terminal (first computer) 2 arranged in the real store, a second communication terminal (second computer) 4 of a client 3 which downloads from an in introduction column and displays a coupon such as a discount that can be used when visiting the real store by browsing the introduction column of the service contract store, and a block shaped input device (one input device) 5 used in a series of contact operations in which after contacting a display surface of the first communication terminal 2, contacts with the display surface of the second communication terminal 4 of the client 3 which displayed the discount coupon and which is another communication terminal part from the first communication terminal, or after contacting a display surface of the second communication terminal 4, contacts the display surface of the first communication terminal 2.

As is shown in FIG. 2 to FIG. 5, the input device 5 has conductivity at least on a side surface 6 and a bottom surface 7, and the electrostatic capacitance of a human body is transmitted to the bottom surface 7 of the input device 5 by a hand grasping the side surface 6. In addition, the first and second communication terminals 2 and 4 are arranged with a panel module (display surface having a contact recognition function) 10 as a display screen formed by stacking a touch panel 8 (see FIG. 6) and a display panel 9 (see FIG. 6). Next, the bottom surface 7 of the input device 5 is arranged (contact) with four protruding contactors 12 which form a contact surface 11 (hereinafter referred to as a "contact surface") contacting the touch panel 8 and which is placed on a panel module (hereinafter referred to as [display screen"]) 10 of the first and second communication terminals 2 and 4, and the contact surface 11 of the contactor 12 to which electrostatic capacitance of the human body is transmitted is placed on the display screen 10, thereby electrostatic capacitance of the touch panel 8 at the contact position changes, and the change in electrostatic capacitance of the coordinate recognition areas 11a, 11b, 11c, 11d (see FIG. 5) of each contact surface 12 is recognized by the touch panel 8 as an input signal.

Figure 5:
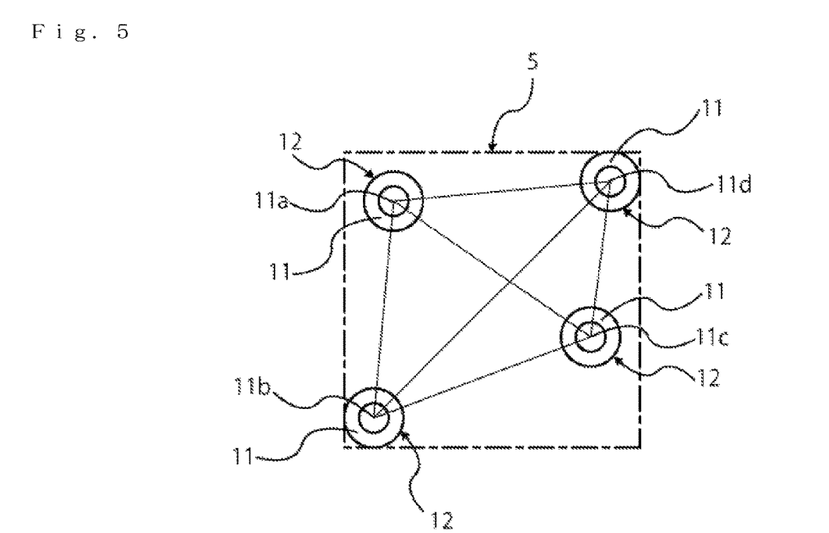
FIG. 5 is a planar view diagram showing the positional relationship of contactors appearing through the input device shown in FIG. 2 seen from above.
Figure 6:
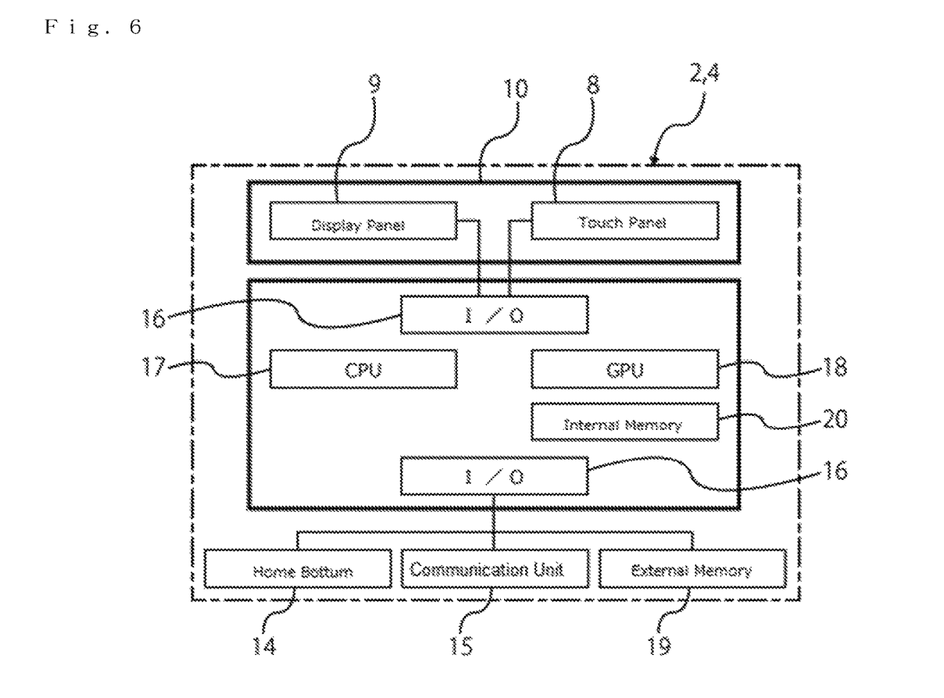
FIG. 6 is a block diagram showing a schematic structure of the smart device shown in FIG. 1.

As is shown in FIG. 6, the first communication terminal 2 and the second communication terminal 4 are arranged with the display screen 10 on a surface formed by stacking the touch panel 8 and the display panel 9, and a housing edge part 13 (see FIG. 4) which fixes the display screen 10 is arranged with a home button 14, a communication unit 15 for constructing a wireless LAN (Local Area Network) such as WiFi (Wireless Fidelity), and an I/O (Input/Output) interface 16 which connects external devices. In addition, 17 is a CPU (Central Processing Unit) which controls the touch panel 8, the display panel 9, the home button 14, the communication unit 15 and the I/O interface 16 and the like, an OS (Operating System) installed in the communication terminal is executed by control of the CPU 17, an image is displayed on the display panel 9 via a GPU (Graphics Processing Unit) 18, and an embedded application and an installed application and the like stored in an external memory 19 are executed via an internal memory 20. Furthermore, the CPU 17 controls passing of position coordinate information to the OS using a change in electrostatic capacitance occurring on the touch panel 8 as a touch event. In this way, on the basis of the input signal, in the first and second communication terminals 2 and 4, an arrangement pattern of the contactors 12 is obtained based on the input signal using each contact coordinate point corresponding to the coordinate recognition areas 11a, 11b, 11c, 11d, the input device 5 placed on the display screen 10 of the first and second communication terminals 2 and 4 is identified and contact information showing contact by the input device 5 is generated. A speaker, power supply unit and the like are omitted.

In this way, in the first and second communication terminals 2 and 4, each contact information is obtained by contact of the input device 5, and each contact information is transmitted to the administrative server 1 via the communication unit 15. Furthermore, in the second communication terminal 4, authentication information is received from the administrative server 1 via the communication unit 15 based on the contact information which authenticates a series of continuous contact operations have contacted both the display screen 10 of the first communication terminal 2 and the display screen 10 of the second communication terminal 4 by the input device 5, and the second communication terminal 4 displays the authentication information on the display screen (panel module) 10 of the second communication terminal 4.

Figure 7:
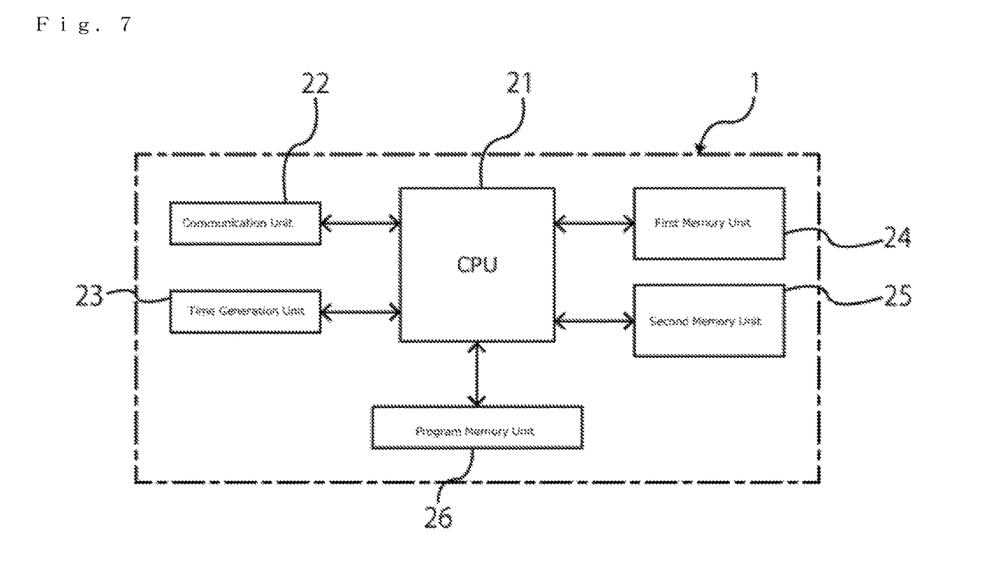
FIG. 7 is a block diagram showing a schematic structure of the administrative server shown in FIG. 1.

As is shown in FIG. 7, the administrative server 1 includes a central processing unit (CPU) 21 formed including a main storage unit, a calculation unit, and a control unit, a communication unit 22 which receives the contact information from the first and second communication terminals 2 and 4 respectively and transmits authentication information based on the contact information to the second communication terminal 4, a time generating unit 23 for specifying the time (value of time) of reception by the communication unit 22 of each contact information transmitted from the first and second communication terminals 2 and 4, a first memory unit 24 that correlates and stores each contact information received from the first and second communication terminals 2 and 4 and each value of time based on the first and second communication terminals 2 and 4 with the first and second communication terminals 2 and 4, a second memory unit 25 which stores a permitted value of the time when contact by the input device 5 at the first and second communication terminals 2 and 4 is permitted as a series of consecutive contacts, and a program memory unit 26 for storing an authentication program for transmitting the authentication information to the second communication terminal in the case where contact information received from the first communication terminal 2 and the contact information received from the second communication terminal 4 are based on the contact by the same input device 5, and it is judged that a difference in time obtained from the value of time based on the first communication terminal 2 and the value of time based on the second communication terminal 4 satisfies the permitted value of the time.

In the central processing unit 21, each contact information at the first and second communication terminals 2 and 4 and each value of time based on the first and second communication terminals 2 and 4 are correlated with the first and second communication terminals 2 and 4 and stored in the first memory unit 24, a judgement (first judgement means) is made whether the contact information in the second communication terminal 4 stored in the first memory unit 24 corresponds to the contact information in the first communication terminal 2, and in the case where it is judged they correspond, a judgment (second judgment means) is made whether a difference in time obtained from the value of the time based on the first communication terminal 2 and the value of the time based on the second communication terminal satisfies a permitted value of the time, and in the case where it is judged that the permitted value is satisfied, the central processing unit 21 controls so that authentication information is sent to the second communication terminal 4 via the communication unit 23 based on the contact information that contact of the input device 5 at the first and second communication terminals 2 and 4 is series of consecutive contact operations from the first communication terminal 2 to the second communication terminal 4 or from the second communication terminal 4 to the first communication terminal 2.

Figure 8:
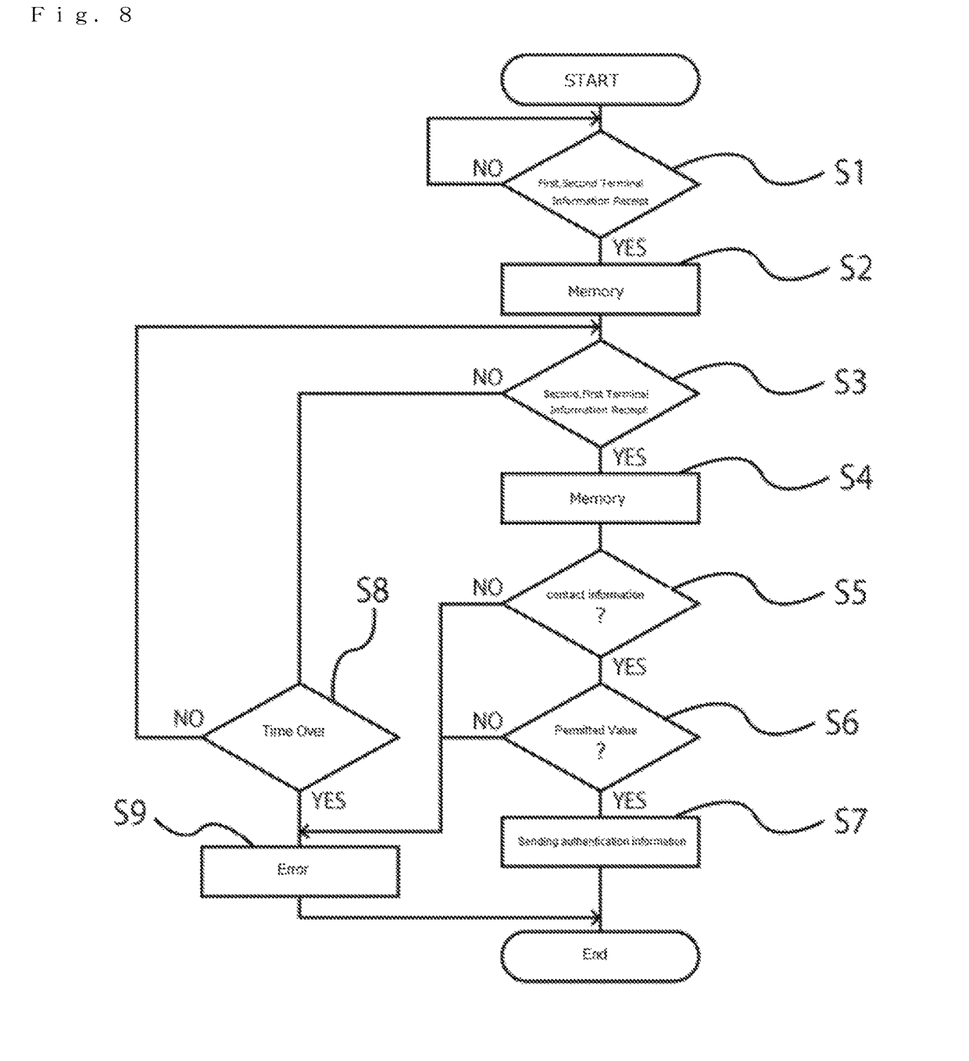
FIG. 8 is a flowchart for explaining an example of an authentication program.

Next, explanation is given based on based on the authentication program while referring to FIG. 8.

The administrative server 1 is in a reception waiting state by the communication unit 22. If the communication unit 22 receives contact information based on a contact operation by the input device 5 from the first and second communication terminals 2 and 4 (step S1: first and second receiving means), by control of the central processing unit 21, the value of the time of receiving the contact information and the contact information are correlated with the first and second communication terminals 2 and 4 and stored in the first memory unit 24 (step S2: first and second contact information memory means). Next, if the communication unit 22 receives contact information based on the contact operation by the input device 5 from the second and first communication terminals 4 and 2 (step S3: second and first receiving means), by control of the central processing unit 21, the value of the time of receiving the contact information and the contact information are correlated with the second and first communication terminals 4 and 2 and stored in the first memory unit 24 (step S4: second and first contact information memory means). Next, it is judged whether or not the contact information in the second communication terminal 4 stored in the first memory unit 24 corresponds to contact information in the first communication terminal 2 (step S5: first judgement means), and if it is judged that they correspond, a judgement is made whether a difference in time obtained by the value of the time based on the first communication terminal 2 and the value of the time based on the second communication terminal 4 satisfies a permitted value of time stored in the second memory unit 25 (step S6: second judgment means), and if it is judged that it satisfies the permitted value, authentication information based on the contact information is sent to the second communication terminal 4 (step S7: viewing information transmitting means). Furthermore, in the case where contact information can not be obtained from the second and first communication terminals 4 and 2 in step S3, it may be judged whether or not the elapsed time set in advance has passed (step S8), and in the case of time over, it does not correspond in step S5 and in the case where the permitted value is not satisfied in step 6, a signal for displaying an error and the like on the first communication terminal 2 or the like may be transmitted (step S9). Furthermore, in the case where contact information is received from the first communication terminal 2 in step S1 (first receiving means), in step S2, it is correlated with the first communication terminal 2 and stored (first contact information memory means), in step S3, contact information from the second communication terminal 4 is received (second receiving means), and in step S4 contact information in the second communication terminal 4 is correlated with the second communication terminal 4 and stored (second contact information memory means). In addition, in the case where the contact information is received from the second communication terminal 4 in step S1 (second receiving means), it is correlated with the second communication terminal 4 and stored in step S2 (second contact information memory means), in step S3, contact information from the first communication terminal 2 is received (first receiving means), and in step S4 contact information in the first communication terminal 2 is correlated with the first communication terminal 2 and stored (second contact information memory means).

In the contact operation by the input device 5, the first communication terminal 2 and the second communication terminal 4 are placed in the same space and if a contact operation is performed continuously between both the display screen 10 of the first communication terminal 2 and the display screen 10 of the second communication terminal 4, because a time difference always occurs, a time difference also occurs in each contact information obtained by the administrative server 1.

According to the present embodiment, since it is authenticated whether or not it is a series of contacts according to whether the difference in time obtained from the value of time based on the first communication terminal 2 and the value of time based on the second communication terminal 4 by contact of one input device 5 is within a permitted value of time when contacting across both the display screen 10 of the second communication terminal 4 and the display screen 10 of the second communication terminal 4, it is possible to recognize an act that the input device 5 is used continuously from the first communication terminal 2 to the second communication terminal 4 or from the second communication terminal 4 to the first communication terminal 2, and it is possible to specify as a series of consecutive contact operations within a real store space and thereby it is possible to accurately grasp the actual results by the reputation advertisement service.

Furthermore, the administrative server 1 may exist on the Internet or may be installed in the same space as a real store. In the case where it is impossible to connect to the Internet, it may be processed by a server in the same space and later processed as a posterior consent to the administrative server 1 on the Internet. In addition, smart devices may be used as the first and second communication terminals 2 and 4. In addition, authentication information may be "completed" stamp information, character image information to be collected, an image displayed on the first communication terminal 2 when a contact operation is performed by the input device 5 (viewing information), or may be a signal which makes these possible to be displayed or a voice signal. In addition, contact by the input device 5 naturally includes a pressing operation on the touch panel 8. Therefore, a series of contact operations may be print operations. Furthermore, it is sufficient to use a clock function installed in a computer as the time generating unit 23, and it is sufficient to extract a value of time such as the time using the OS or an application.

In addition, the second judgment means may be implemented in the first communication terminal 2 or the second communication terminal 4. In the case where the second judgment means is implemented in the first communication terminal 2, a computer system may be formed in which the first communication terminal 2 includes a means for sending contact information in the first communication terminal 2 by the input device 5 to the administrative server 1, a means for obtaining from the administrative server 1 a value of time based on the first communication terminal 2 when receiving contact information at the first communication terminal 2, a value of time based on the second communication terminal 4 when receiving contact information at the second communication terminal 4, and a permitted value of the time, a means (second judgment means) for judging whether or not the difference in time obtained from the value of each time satisfies the permitted value of the time, and a means for sending an approval request based on the contact information to the administrative server 1 in the case where the judgment means judges that the permitted value of the time is satisfied, wherein the second communication terminal 4 has a means for sending contact information at the second communication terminal 4 by the input device 5 to the administrative server 1, and in the case where the administrative server 1 obtains contact information at the first communication terminal 2 from the first communication terminal 2 and obtains contact information at the second communication terminal 4 from the second communication terminal 4, a means for transmitting each value of time based on the first and second communication terminals 2 and 4 and the permitted value of the time when each contact information was obtained to the first communication terminal 2, and a means for sending authentication information based on the contact information to the second communication terminal 4 when the approval request is obtained from the first communication terminal 2. In addition, in the case where the second judgment means is implemented in the second communication terminal 4, a computer system may be formed in which the first communication terminal 2 includes a means for sending contact information in the first communication terminal 2 by the input device 5 to the administrative server 1, the second communication terminal 4 includes a means for sending contact information in the second communication terminal 4 by the input device 5 to the administrative server 1, a means for obtaining from the administrative server 1 a value of time based on the first communication terminal 2 when receiving contact information at the first communication terminal 2, a value of time based on the second communication terminal 4 when receiving contact information at the second communication terminal 4, and a permitted value of the time, a means (second judgment means) for judging whether or not the difference in time obtained from the value of each time satisfies the permitted value at the time, and a means for sending an approval request based on the contact information to the administrative server 1 in the case where the judgment means judges that the permitted value of time is satisfied, and in the case where the administrative server 1 obtains contact information at the first communication terminal 2 from the first communication terminal 2 and obtains contact information at the second communication terminal 4 from the second communication terminal 4, a means for transmitting the values of each time based on the first and second communication terminals 2 and 4 and the permitted value of the time when each contact information was obtained to the second communication terminal 4, and a means for sending authentication information based on the contact information to the second communication terminal 4 from the first communication terminal 2 when the approval request is obtained.

In addition, in the present embodiment, unique information of the first communication terminal 2 which identifies the first communication terminal (first computer) 2 arranged in a real store, an input device 5 ID (contact information) used in the real store, and red inkpad information to be displayed on the display screen 10 when contacting the input device 5 owned by a service contract store is registered in the memory unit (for example, second memory unit 25) of the administrative server (third computer) 1 of the service provider. In addition, since the second communication terminal 4 owned by a client which is another communication terminal other than the first communication terminal 2, browses the web page established by the service provider and downloads a coupon and the like, it is possible to form the administrative server 1 and the second communication terminal 4 into a computer system in which session information in the second communication terminal 4 is registered.

As an embodiment of the computer system described above, a computer system may also be formed including first and second communication terminals 2 and 4 having a display screen 10 having a contact recognition function and which obtain contact information from contact with the display screen 10, an input device 5 to contact with the display screen 10 of the first communication terminal 2 and the display screen 10 of the second communication terminal 4, and an administrative server 1 which stores a permitted value of time which permits contact by the input device 5 in the first and second communication terminals 2 and 4 as a series of consecutive contacts, wherein the first communication terminal 2 includes a means for sending contact information at the first communication terminal 2 by the input device 5 to the administrative server 1, the second communication terminal 4 includes a means for sending contact information at the second communication terminal 4 by the input device 5 together with session information to the administrative server 1, and in the case where the administrative server 1 obtains contact information at the first communication terminal 2 from the first communication terminal 2, and obtains contact information at the second communication terminal 4 from the second communication terminal 4, a means for judging whether or not a difference of time obtained from a value of each time when obtained from each contact information satisfies a permitted value of the time, and in the case where the means for judging judges that the permitted value of time is satisfied, a means for sending authentication based on the contact information to the second communication terminal 4.

In addition, a computer system may also be formed including a first and second communication terminals 2 and 4 arranged with a display screen 10 having a contact recognition function and obtaining contact information from contact with the display screen 10, an input device 5 to contact with the display screen 10 of the first communication terminal 2 and the display screen 10 of the second communication terminal 4, and an administrative server 1 which stores a permitted value of time which permits contact by the input device 5 in the first and second communication terminals 2 and 4 as a series of consecutive contacts, wherein the first communication terminal 2 has a means for sending contact information at the first communication terminal 2 by the input device 5 to the administrative server 1, the second communication terminal 4 has a means for sending contact information at the second communication terminal 4 by the input device 5 together with session information to the administrative server 1, a means for obtaining from the administrative server 1 a value of time based on the first communication terminal 2 when receiving contact information at the first communication terminal 2, a value of time based on the second communication terminal 4 when receiving contact information at the second communication terminal 4, and a permitted value of the time, a means for judging whether or not a difference in time obtained from each value of time satisfies the permitted value of the time, and a means for sending an approval request based on the contact information to the administrative server 1 in the case when the judging means judges that the permitted value of time is satisfied, wherein in the case where the administrative server 1 obtains contact information at the first communication terminal 2 from the first communication terminal 2 and obtains contact information at the second communication terminal 4 from the second communication terminal, a means for transmitting the values of each time based on the first and second communication terminals 2 and 4 when each contact information is obtained, and the permitted value of the time to the second communication terminal 4, and a means for sending authentication information based on the contact information to the second communication terminal 4 when the approval request is obtained.

Furthermore, a computer system may also be formed including a first and second communication terminals 2 and 4 arranged with a display screen 10 having a contact recognition function and obtaining contact information from contact with the display screen 10, an input device 5 contacting with the display screen 10 of the first terminal 2 and the display screen 10 of the second communication 4, and an administrative server 1 which stores a permitted value of time when permitting contact by the input device 5 at the first and second communication terminals 2 and 4 as a series of consecutive contacts, wherein the first communication terminal 2 has a means for sending contact information at the first communication terminal 2 by the input device 5 to the administrative server 1, a means for obtaining from the administrative server 1 a value of the time based on the first communication terminal 2 when contact information at the first communication terminal 2 is received and a value of the time based on the second communication terminal 4 when contact information at the second communication terminal 4 is received, and a permitted value of time, a means for judging whether or not a difference in time obtained from each value of time satisfies the permitted value of the time, and in the case where the means for judging judges that the permitted value of time is satisfied, a means for sending an approval request based on the contact information to the administrative server 1, wherein the second communication terminal 4 has a means for sending contact information at the second communication terminal 4 by the input device 5 together with session information to the administrative server 1, and in the case where the administrative server 1 obtains contact information at the first communication terminal 2 from the first communication terminal 2 and obtains contact information at the second communication terminal 4 from the second communication terminal 4, a means for transmitting to the first communication terminal 2 the values of each time based on the first and second communication terminals 2 and 4 when each contact information is obtained, and the permitted value of the time, and a means for sending authentication information based on the contact information to the second communication terminal 4 when the approval request is obtained from the first communication terminal 2.

Second Embodiment

The present embodiment is a computer system which performs a judgment in the second communication terminal 4 whether a difference of time obtained from the value of time based on the first communication terminal 2 and the value of time based on the second communication terminal 4 in the first embodiment satisfies the time permitted value.

The present embodiment is explained with reference to FIG. 1 to FIG. 7. Furthermore, the same reference numerals indicate the same or corresponding parts.

In FIG. 1, the first communication terminal 2 transmits contact information in the first communication terminal 2 by the input device 5 to the administrative server 1.

The second communication terminal 4 transmits contact information in the second communication terminal 4 by the input device 5 together with the session information to the administrative server 1, and obtains from the administrative server 1 a value of time based on the first communication terminal 2 when contact information in the first communication terminal 2 corresponding to the contact information at the second communication terminal 4 is received, a value of time when the second communication terminal 4 is received, and the permitted value. Therefore, the external memory 19 shown in FIG. 6 is arranged with an area for storing each value of time based on the first and second communication terminals 2, 4 obtained from the administrative server 1 and the permitted value. Next, by control of the CPU 17 of the second communication terminal 4, it is judged whether or not the difference in time obtained from each value of time satisfies the permitted value of the time, and in the case where it is judged that it satisfies the permitted value, an approval request which is seen as a series of consecutive contacts based on the contact information is sent to the administrative server 1.

The administrative server 1 obtains contact information in the first communication terminal 2 from the first communication terminal 2 and acquires contact information in the second communication terminal 4 from the second communication terminal 4. Therefore, an area for storing contact information obtained from the first communication terminal 2 and a value of time when receiving the contact information and an area for storing contact information obtained from the second communication terminal 4 and a value of time when receiving the contact information are arranged in the first memory unit 24 shown in FIG. 7. In addition, in the case where the CPU 21 of the administrative server 1 receives from the second communication terminal 4 a request to obtain each value of time based on the first and second communication terminals 2, 4 and the permitted values of the time, each time of value and the permitted value are sent to the second communication 4 and control is carried out so that authentication information based on the contact information is sent to the second communication terminal 4 in the case when the approval request is obtained from the second communication terminal 4.

Therefore, a program is installed in the external memory 19 of the second communication terminal 4 for judging whether or not a difference in time obtained from each value of time satisfies the permitted value of the time, and in the case where the permitted value of the time is satisfied, transmits an approval request which is seen as a series of consecutive contacts based on the contact information to the administrative server 1, and instead of the authentication program shown in FIG. 8, a program storage memory 26 of the administrative server 1 is installed with a program for sending each value of time and the permitted value to the second communication terminal 4 in the case where a request to obtain each value of time and the permitted value of time based on the first and second communication terminals 2 and 4 is received from the second communication terminal 4, and sends authentication information based on the contact information to the second communication terminal 4 in the case where the approval request is obtained from the second communication terminal 4.

According to the present embodiment, as in the first embodiment, since it is recognized that it is an act that is continuously used between the first communication terminal 2 and the second communication terminal 4 by the input device 5, it is possible to identify as a series of contact operations within a real store space and it is possible to accurately understand the actual results of the reputation advertisement service. In addition, since it is possible to identify a smart device owned by a client by session information, it is effective in the case when contact information by the input device 5 is received from the smart device owned by the client before the smart device owned by the real store.

Furthermore, if an ID specifying the input device 5 is stored in the second memory unit 25 of the administrative server 1 as contact information of the input device 5, and it is judged whether the contact information previously received from the smart device owned by a client corresponds to the contact information stored in the second memory unit 25, and session information is not necessarily required.

Third Embodiment

The present embodiment is an authentication system in the case where the authentication information in the first embodiment is visual information such as a stamp image. FIG. 1 to FIG. 8 are referred to and the same reference numerals as those in FIG. 9 illustrate the same or corresponding parts.

Figure 9:
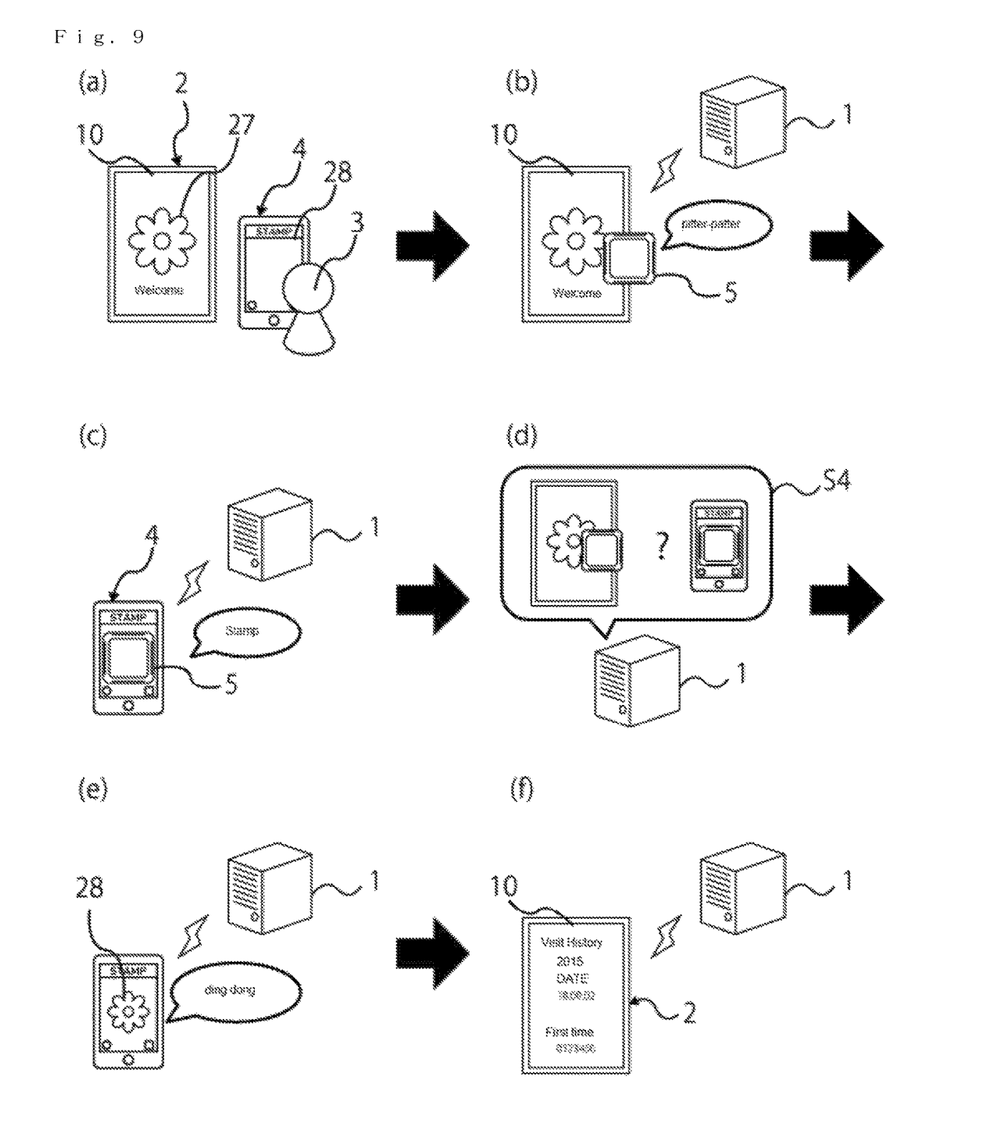
FIG. 9 is an explanation diagram for explaining a form of one embodiment of the present disclosure.

As is shown in FIG. 9(*a*), the red inkpad information 27 representing a visit welcome is displayed on the display screen 10 of the store terminal 2, stamp base information 28 to which the data of the browse trace is provided is displayed on the client terminal 4, and the store terminal 2 and the client terminal 4 are present in the real store space.

As is shown in FIG. 9(*b*), if store staff or a client 3 stamps the stamp (input device) 5 against the red inkpad information 27 displayed on the store terminal 2, an ID of the store terminal 2, a stamp code (contact information) and red inkpad information and the like associated with the stamp code are transmitted to an authentication server (administrative server) 1 from the store terminal 2. This information is stored in the first memory unit 24 of the authentication server 1. At the same time, a value of time when the stamp code at the store terminal 2 is received is correlated and stored with the stamp code. Therefore, the ID of the store terminal 2, the stamp code at the store terminal 2, the red inkpad information and the value of time based on the store side terminal 2 are stored in the first memory unit 24 as a series of records.

After the stamp operation, as shown in FIG. 9(C), if the stamp 5 is stamped against the stamp mount 28 displayed on the client terminal 4, an ID of the client terminal 4, a stamp code (contact information), browsing trace information linked to the stamp code, and viewing information acquisition request information and the like are transmitted from the client terminal 4 to the authentication server 1. This information is stored in the first memory unit 24 of the authentication server 1 together with a value of time when receiving a stamp code at the client terminal 4. Therefore, the ID of the client terminal 4, the stamp code at the client terminal 4, the value of time based on the client terminal 4, the browsing trace information and the viewing information acquisition request information and the like are stored in the first memory unit 24 as a series of records.

As is shown in FIG. 9(*d*), in the authentication server 1 which has received various information, in the case when contact information obtained from the client terminal 4 is the same contact information as the contact information obtained from the store terminal 2 (the same step as step S5 in FIG. 8), it is judged whether a difference in time obtained from a value based on the store terminal 2 and a value of time based on the client terminal 4 satisfies a permitted value of time permitted as a series of consecutive contacts (step similar to step S6 in FIG. 8).

Next, as is shown in FIG. 9(*e*), in the case where it is judge that the permitted value is satisfied, viewing information based on the contact information is transmitted to the client terminal 4 by the viewing information acquisition request (same step as step S7 in FIG. 8), and the same stamp image 28 as the red inkpad information is displayed on the display screen 10 of the client terminal 4. Furthermore, sound information may be output.

Furthermore, in the authentication server 1, as is shown in FIG. 9(*f*), a visit history is recorded based on the browsing trace information.

An authentication method in the authentication system may also include first and second communication terminals (first and second computers) 2 and 4 having a display screen 10 having a contact recognition function and obtaining contact information from contact with the display screen 10, an input device 5 contacting with the display screen 10 of the first communication terminal (first computer) 2 displaying the red inkpad information 27 and the display screen 10 of the second communication terminal (second computer) 4, and an administrative server (third computer) 1 storing a permitted value of time permitting contact by the input device 5 in the first and second communication terminals (first and second computers) 2 and 4 as a series of consecutive contacts, a step of sending each contact information at the first and second communication terminals (first and second computers) 2 and 4 by the input device 5 to the administrative server (third computer) 1 from the first and second communication terminals (first and second computers) 2 and 4, a step of storing in the administrative server (third computer) 1 each value of time based on the first and second communication terminals (first and second computers) 2 and 4 when the contact information in the first and second communication terminals (first and second computers) 2 and 4 is received, a step of judging whether contact information in the second communication terminal (second computer) 4 corresponds to contact information in the first communication terminal (first computer) 2, in the case where it is judged that they correspond, a step of judging whether a difference in time obtained from a value of time based on the first communication terminal (first computer) 2 and a value of time based on the second communication terminal (second computer) 4 satisfies a permitted value of the time, and in the case where it is judged that the permitted value is satisfied, a step of sending viewing information 28 based on the red inkpad information 27 displayed in the first communication terminal (first computer) 2 to the second communication terminal (second computer) 4.

In addition, an authentication method may also include first and second communication terminals (first and second computers) 2 and 4 having a display screen 10 having a contact recognition function and obtaining contact information from contact with the display screen 10, an input device 5 contacting with the display screen 10 of the first communication terminal (first computer) 2 displaying the red inkpad information 27 and the display screen 10 of the second communication terminal (second computer) 4, and an administrative server (third computer) 1 storing a permitted value of time permitting contact by the input device 5 in the first and second communication terminals (first and second computers) 2 and 4 as a series of consecutive contacts, a step of sending each contact information at the first and second communication terminals (first and second computers) 2 and 4 by the input device 5 to the administrative server (third computer) 1 from the first and second communication terminals (first and second computers) 2 and 4, a step of storing in the administrative server (third computer) 1 each value of time based on the first and second communication terminals (first and second computers) 2 and 4 when the contact information in the first and second communication terminals (first and second computers) 2 and 4 is received, a step of judging whether contact information in the second communication terminal (second computer) 4 corresponds to contact information in the first communication terminal (first computer) 2, in the case where it is judged that they correspond, a step of sending to the second communication terminal (second computer) 4 a value of time based on the first communication terminal (first computer) 2, a value of time based on the second communication terminal (second computer) 4, and a permitted value of the time, a step of judging in the second communication terminal (second computer) 4 whether or not a difference in time obtained from each value of time satisfies the permitted value of the time in the case where the value of each time and the permitted value of the time is received from the administrative server (third computer) 1, and in the case where it is judged that the permitted value is satisfied, a step of displaying viewing information 28 based on red inkpad information 27 sent from the administrative server (third computer) 1 and displayed on the first communication terminal (first computer) 2.

Furthermore, an authentication method may also include first and second communication terminals (first and second computers) 2 and 4 having a display screen 10 having a contact recognition function and obtaining contact information from contact with the display screen 10, an input device 5 contacting with the display screen 10 of the first communication terminal (first computer) 2 displaying the red inkpad information 27 and the display screen 10 of the second communication terminal (second computer) 4, and an administrative server (third computer) 1 storing a permitted value of time permitting contact by the input device 5 in the first and second communication terminals (first and second computers) 2 and 4 as a series of consecutive contacts, a step of sending each contact information at the first and second communication terminals (first and second computers) 2 and 4 by the input device 5 to the administrative server (third computer) 1 from the first and second communication terminals (first and second computers) 2 and 4, a step of storing in the administrative server (third computer) 1 each value of time based on the first and second communication terminals (first and second computers) 2 and 4 when the contact information in the first and second communication terminals (first and second computers) 2 and 4 is received, a step of judging whether contact information in the second communication terminal (second computer) 4 corresponds to contact information in the first communication terminal (first computer) 2, in the case where it is judged that they correspond, a step of sending to the first communication terminal (first computer) 2 a value of time based on the first communication terminal (first computer) 2, a value of time based on the second communication terminal (second computer) 4, and a permitted value of the time, a step of judging in the first communication terminal (first computer) 2 whether or not a difference in time obtained from each value of time satisfies the permitted value of the time in the case where each value of time and the permitted value of the time is received from the administrative server (third computer) 1, and in the case where it is judged that the permitted value is satisfied, a step of sending to the administrative server (third computer) 1 a sending request of viewing information 28 based on red inkpad information 27 displayed on the second communication terminal (second computer) 4.

Fourth Embodiment

The present embodiment is a modified example of the second embodiment, and is an authentication system in which authentication information is used as viewing information such as a stamp image. FIG. 1 to FIG. 9 are referred to and the same reference numerals as those in FIG. 10 indicate the same or corresponding parts.

Figure 10:
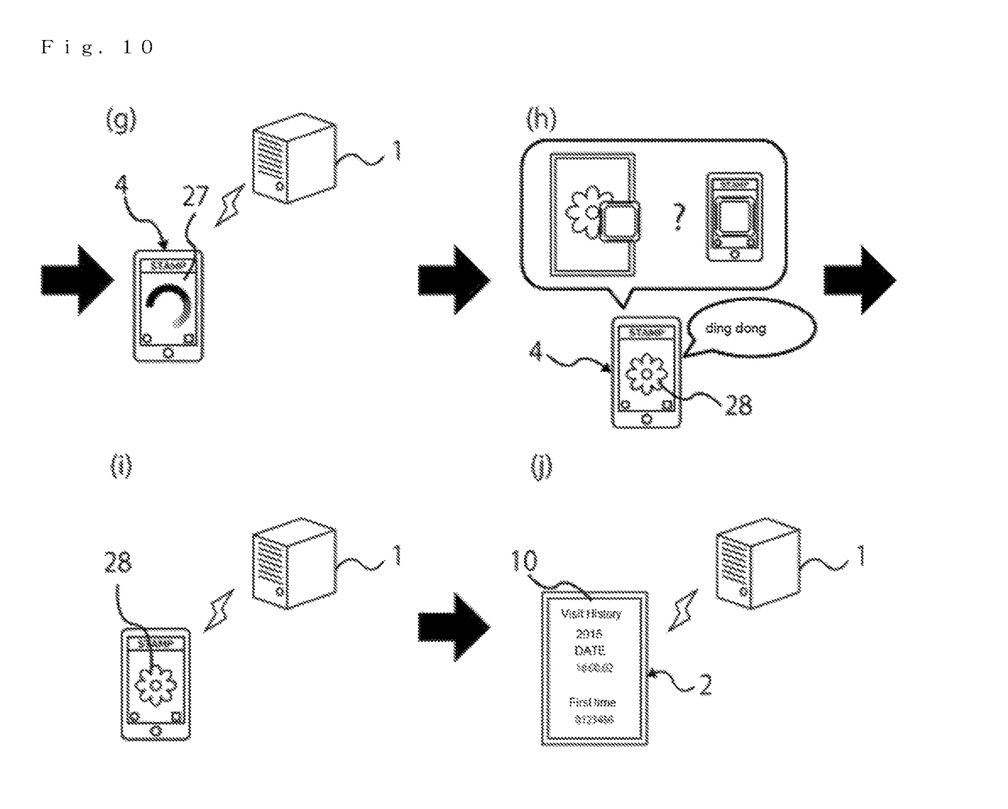
FIG. 10 is an explanation diagram for explaining a form of one embodiment of the present disclosure.

In the present embodiment, after passing through the same steps as in FIGS. 9(*a*), (*b*) and (*c*) in the third embodiment, as is shown in FIG. 10(*g*), a client terminal 4 obtains contact information at the store terminal 2 corresponding to contact information at the client terminal 4 from the authentication server 1, a value of time based on the store terminal 2 corresponding to the contact information, a value of time based on the client terminal 4 and a permitted value of time and also obtains a stamp image 28 to be displayed in the case when a series of contact operation permitted time (permitted value) which is a judgement condition is satisfied, and as shown in FIG. 10(*h*), the client terminal 4 judges whether or not a difference in time obtained from the value of time based on the client terminal 4 and the value of time based on the store terminal 2 satisfies the permitted value of the time, and in the case where the permitted time is satisfied, the stamp image 28 is displayed on the display screen 10 of the client terminal 4. Following this, as is shown in FIG. 10(*i*), success information showing that the permitted time is satisfied is transmitted from the client terminal 4 to the authentication server 1, and store visit history is recorded based on the success information in the authentication server 1 as is shown in FIG. 10(*j*).

In the case where the success information does not correspond to the permitted time stored in the authentication server 1, a series of procedures may be canceled by transmitting an invalid image or the like.

Fifth Embodiment

Instead of the real store space in FIG. 1, the present embodiment is an authentication system which provides a service for displaying a character image (for example, a stamp image 28) as one or a plurality of red inkpad information 27 on the display screen 10 of the first communication terminal 2, and distributes the character image in the case of a series of continuous contacts by the input device 5, and is arranged with a distribution space in which the second communication terminal 4 exists in a state close to the first communication terminal 2, and the authentication server 1 which permits distribution of the character image from the first communication terminal 2 to the second communication terminal 4.

An explanation is given while referring to FIG. 1, FIG. 6, FIG. 7, and FIG. 9. The same symbols indicate the same or corresponding parts.

A plurality of character images are displayed on the first communication terminal 2, and if the input device 5 is pressed against one character image, the contact information at the first communication terminal 2 by the input device 5 and a character image existing in the first communication terminal 2 linked to this contact information are sent to the authentication server 1, and the authentication server 1 stores the value of time when the contact information from the first communication terminal 2 is obtained, the contact information and the character image in the first memory section 24.

Next, if the input device 5 is pressed on the display screen 10 of the second communication terminal 4, the contact information at the second communication terminal 4 by the input device 5 and the visual information acquisition request linked to the contact information are sent to the authentication server 1.

Next, in the authentication server 1, in the case where the contact information and the viewing information acquisition request in the second communication terminal 4 is obtained, the value of time when the contact information from the second communication terminal 4 was obtained and the contact information and the viewing information are stored in the first memory unit 24, a judgment is made whether the value of time based on the first communication terminal 2 and the elapsed time obtained from the second communication terminal 4 satisfy a permitted value of time stored in the second memory unit 25, and in the case where the permitted value is satisfied, the character image based on the contact information is sent to the second communication terminal 4.

Following this, the character image is displayed on the display screen 10 of the second communication terminal 4.

Furthermore, in the present disclosure, if the permitted value is set within, for example, 60 seconds, or within 30 seconds, or even a short time less than 10 seconds such as 1 or 2 seconds, it is possible to easily recognize a series of contact operations. In addition, the contact surface of one input device may also be a character surface including characters such as a seal. In addition, in the case when a contact operation is performed a plurality of times consecutively on one display surface, a value of time when the contact information is received by the last touch operation on the one display surface is adopted, and the value of time of when the contact information is received by the first contact operation on the other display surface may be adopted. In addition, by changing a character image or the like displayed on the first communication terminal 2 for each distribution space for each distribution space, since the distribution space positions are different, it is possible to use the same one input device. In addition, it is possible to obtain information for understanding a real store and a client communication terminal by GPS or the like which provides further security.

TABLE OF REFERENCE NUMBERS

1 Administrative Server (third computer, server computer, authentication server)
2 First Communication Terminal (first computer, store terminal, smart device)
3 Client
4 Second Communication Terminal (second computer, client terminal, smart device)
5 Input Device (one input device, stamp)
6 Side
7 Bottom
8 Touch Panel
9 Display Panel
10 Display Screen (panel module, display surface having touch recognition function)
11 Contact Surface
11*a*, 11*b*, 11*c*, 11*d* Coordinate Recognition Area
12 Contactor
13 Housing Edge
14 Home Button
15 Communication Unit
16 I/O Interface
17 CPU
18 GPU
19 External Memory
20 Internal Memory
21 Central Processing Unit (CPU)
22 Communication Unit
23 Time Generation Unit
24 First Memory Unit
25 Second Memory Unit
26 Program Memory Unit
27 Red Inkpad Information
28 Stamp Image

What is claimed is:

1. An authentication method for a system including a first computer and a second computer, each having a display surface having a contact recognition function, and for obtaining contact information from a contact with the display surface, one input device configured to make contact with the display surface of the first computer displaying red inkpad information and the display surface of the second computer; and a third computer configured to store a permitted value of time when permitting contact by the one input device at the first computer and the second computer as a series of consecutive contacts, the authentication method comprising:
transmitting contact information from the first computer and the second computer by the one input device to the third computer respectively at the first computer and the second computer;
storing values of time based on the first computer and the second computer when contact information is received from the first computer and the second computer respectively in the third computer;
judging whether or not contact information in the second computer corresponds to contact information in the first computer;
if the contact information in the second computer corresponds to the contact information in the first computer, judging whether or not a difference in time obtained from each value of time based on the first computer and the second computer stored in the third computer satisfies the permitted value of the time; and
transmitting viewing information in the third computer based on the red inkpad information displayed on the first computer to the second computer when it is judged that the permitted value is satisfied.

2. The authentication method according to claim 1, wherein the red inkpad information is selected from character information and image information.

3. The authentication method according to claim 1, wherein the viewing information is equivalent to the red inkpad information.

4. The authentication method according to claim 1, wherein the first and/or the second computer is a mobile terminal.

5. A computer system comprising:
a first computer and a second computer each having a display surface having a contact recognition function, and for obtaining contact information from a contact with the display surface;
one input device configured to make contact with the display surface of the first computer displaying red inkpad information and the display surface of the second computer; and
a third computer configured to storing a permitted value of time when permitting contact by the one input device at the first computer and the second computer as a series of consecutive contacts;
the first computer including a means for sending contact information on the first computer by the one input device to the third computer,
the second computer including a means for sending contact information on the second computer by the one input device to the third computer,
the third computer including a means for storing values of time based on the first computer and the second computer when contact information is received from the first computer and the second computer respectively, and a means for judging whether or not the contact information in the second computer corresponds to the contact information in the first computer,
if the contact information in the second computer corresponds to the contact information in the first computer, judging whether or not a difference in time obtained from each value of time based on the first computer and the second computer stored in the third computer satisfies the permitted value of the time; and
transmitting viewing information in the third computer based on the red inkpad information displayed on the first computer to the second computer when it is judged that the permitted value is satisfied.

6. The computer system according to claim 5, wherein first and/or the second computer is a mobile terminal.

7. A server computer comprising:
a receiving means configured to receive contact information respectively obtained from a first computer and a second computer arranged with a display surface having a contact recognition function, by contact with the display surface by one input device;
a permitted value storage means configured to store a permitted value of time when permitting contact of the one input device in the first computer and the second computer as a series of consecutive contacts;
a contact information storage means configured to store with the contact information values of each time respectively based on the first computer and the second computer when contact information from the first computer and the second computer is received respectively;
a first judgment means configured to judge whether the contact information in the second computer corresponds to the contact information in the first computer;
a second judgment means configured to judge whether or not a difference in time obtained from a value of time based on the first computer and a value of time based on the second computer satisfies a permitted value of the time when it is judged that the contact information in the second computer corresponds to the contact information in the first computer, and
a transmission means configured to transmit viewing information to the second computer as a series of consecutive contacts based on the contact information when it is judged that the permitted value of the time is satisfied.

8. A computer usable program product stored on a non-transitory computer usable medium comprising:
red inkpad information memory program code configured to store red inkpad information to be displayed on a display surface of a first communication terminal including the display surface having a contact recognition function;
first receiving program code configured to receive contact information obtained by contact with the display surface of the first communication terminal by one input device and the red inkpad information;
first contact information memory means configured to store a value of time when contact information at the first communication terminal is received by the first receiving program code, the contact information and the red inkpad information;
second receiving program code configured to receive contact information obtained from a second communication terminal including a display surface having a contact recognition function by contact with the display surface of the second communication terminal by the one input device;
second contact information memory program code configured to store a value of time when contact information at the second communication terminal is received by the second receiving program code and the contact information;
first judgment program code configured to judge whether or not the contact information in the second communication terminal received by the second receiving means corresponds to the contact information in the first communication terminal received by the first receiving program code;
second judgment program code configured to judge whether or not a difference in time obtained from a value of time based on the first communication terminal and a value of time based on the second communication terminal satisfies a permitted value of time when permitting contact by the one input device at the first communication terminal and the second communication terminal as a series of consecutive contacts when it is judged by the first judgment program code that the contact information in the second communication terminal corresponds to the contact information in the first communication terminal; and
viewing information transmission program code configured to transmit the viewing information to the second communication terminal based on the red inkpad information when it is judged that the permitted value is satisfied by the second judgment terminal.

* * * * *